United States Patent Office

2,817,624
Patented Dec. 24, 1957

2,817,624

PREPARATION OF ERGOSTEROL CONTAINING YEAST

Eugene L. Dulaney, Rahway, N. J., assignor to Merck & Co., Inc., Rahway, N. J., a corporation of New Jersey No Drawing. Application August 27, 1954
Serial No. 452,716

17 Claims.  (Cl. 195—82)

This invention relates to the manufacture of yeast and particularly to the manufacture of yeast having a high ergosterol content.

Yeast is manufactured for use, as a food, for human beings and animals, and for medicinal purposes. It is known that yeast and other microorganisms contain small amounts of ergosterol which is the parent substance of vitamin D. A considerable amount of research has been conducted to increase the ergosterol content of yeast. This research has involved variation in strains of microorganisms, carbon and nitrogen sources and ratios, temperature and length of time of incubation, forced aeration and oxidation, and other various conditions of fermentation and nutrient medium, as well as a variety of fermentation procedures. This work has resulted in the production of a maximum of three percent ergosterol based on the weight of the dry yeast with an average production of about two percent. It has long been the belief that this yield of ergosterol is only obtained when a nutrient medium deficient in nitrogen is employed, which also results in a lower yield of yeast.

An object of the invention is to provide a process which will yield a yeast having a relatively high ergosterol content and which may be readily, economically and effectively produced on a commercial scale. Another object is to provide a procedure in connection with which a yeast is produced containing an amount of ergosterol which is many-fold the amount heretofore produced in yeast. Another object is the provision of such a process wherein the growth of yeast does not have to be retarded. A further object is the provision of a process whereby high yield of ergosterol may be obtained without special fermentation conditions and mediums. Other objects and the advantages of the invention will appear hereinafter.

In accordance with the invention, yeasts containing high quantities of ergosterol are produced by fermentation of special selected strains of microorganism of the species *Saccharomyces cerevisiae*. By the use of the special strains of microorganism yields of ergosterol over six percent by weight, based on the dry weight of the yeast, and more commonly, from ten to twenty percent may be obtained. The ability of any microorganism, under any condition, to produce such high yields is quite surprising in view of the low yields which were heretofore believed the maximum obtainable.

The special selected strains of microorganism of the species *Saccharomyces cerevisiae* may be characterized as producing over six percent by weight, based on the dry weight of the yeast, of ergosterol in fermentation mediums, which contain sufficient nutrients, including nitrogen, to produce optimum growth of the microorganism. The strains of the species which are particularly effective in producing ergosterol in high yield are—
MY306 (Y2243), MY784 (Y2244), MY797 (Y2245), MY798 (Y2250), MY813 (Y2246), MY814 (Y2247), MY815 (Y2248), and MY816 (Y2249). These microorganisms are deposited in the culture collection of the Northern Regional Research Laboratory, Peoria, Illinois under the designation in parentheses.

The fermentation of the special selected strains of microorganism is carried by any of the known methods. The nutrient medium should contain a source of carbohydrates, and a varied supply of mineral compounds. The source of carbohydrates may, for example, be one or more of the following: molasses, hydrolyzed wood, straw, bagasse, bran and starch, citrus press juice and fruit cannery wastes, pulp sulfite liquors, and milk and whey. The microorganism may also be grown on entirely synthetic media, with ethanol and acetic acid acting as carbohydrate counterparts. A wide variety of mineral salts may be used, comprising among the most necessary, ammonium sulfate and phosphate, calcium superphosphate and small amounts of magnesium and potassium salts. Various other agents may be added to the medium, such as oxidizing agents, as for example, persulfates, peracetates, perphosphates, hydroquinone, indigo quinone, indigo carmine, methylene blue, and the peroxides of sodium, potassium, and calcium, antifoaming agents and the like.

The yeast propagation usually requires strong aeration and controlled addition of nutrients, in order to minimize the production of ethanol, and a pH ordinarily below six. The microorganism may be grown in a nutritionally adequate medium, or the medium may be low or depleted in one or more elements during one or more phases of the propagation. As an example of this in one embodiment of the invention it is desirable to maintain an insufficient amount of nitrogen during one stage or during all of the propagation. In another embodiment of the invention the carbohydrate, such as molasses, is added continuously, during the fermentation to prevent sugar depletion.

In a preferred embodiment of the invention, whereby maximum yields of ergosterol are obtained, the selected strains of microorganisms are first subjected to a growth stage, and then separated from the medium and subjected to a refermentation stage on a fresh medium. This procedure is commonly carried out by inoculating a glucose medium in a small flask with a suspension of microorganism growth from an agar slant. The inoculum is then incubated for a period of days and used to start a larger flask containing a suitable medium, which is then incubated until maximum growth is obtained. The growth is allowed to settle and then the supernatant is removed. Fresh sterile medium is then added to the concentrated yeast growth and refermentation is carried out to obtain maximum ergosterol production. It is sometimes desirable to carry out the refermentation at a slightly higher temperature than the initial fermentation such as up to 5° C.

The following is a general and desirable method for the propagation of yeast: a dilute mixture of molasses (previously sterilized and clarified), mineral salts and ammonia is inoculated with a special selected strain of microorganism and then concentrated wort is added, from time to time, at such a rate that there is sufficient sugar for the growth of yeast, but not for fermentation to alcohol. Aeration follows the same course, being more vigorous toward the later stages of the process; at the same time, the pH of the mash is kept around 4.0 to 4.5 by the addition of ammonia and sulfuric acid, while the optimum temperature of 30° C. is maintained. At the end of the growth period, which, depending on the process, may last up to eight hours, the yeast is separated by centrifugation and filtration. Fresh medium is then added to the concentrated yeast growth and refermented. The fermentations may be carried out in a batch process or continuously.

The following examples are given for purposes of illustration:

EXAMPLE 1

This process consists of development of inoculum through through serial transfer, after which the fermentation batch is inoculated and allowed to ferment to about the time maximum growth has occurred, when the cells are harvested and refermented until maximum amount of ergosterol has been produced.

An agar slant culture was used to inoculate a 250 cc. flask containing microorganism MY306 (Y2243) in a glucose medium. After twenty-four hours incubation on a rotary shaker at an agitation rate of 0.0035 horse-power per gallon while the temperature was maintained at 28° C., the culture was used to inoculate four more flasks. The four flasks containing a total of 200 milliliters were used to inoculate one five-liter fermentor. The fermentor was charged with 3.2 liters of a medium containing ten percent beet molasses, two percent corn steep liquor, water to make ten percent, and a small quantity of Vegifat A, an anti-foaming agent of the dispersible hydroxylated fatty-acid type produced by Nopco Chemical Co., Harrison, New Jersey. The medium had a pH of seven before sterilizing for twenty minutes at 120° C., and a pH of 6.7 to 6.9 after sterilizing. The temperature of the fermentation was held at 28° C. and the air-flow was three liters per minute. At the end of sixty hours, the cells are harvested by centrifugation and then placed into fresh medium having the same composition and refermented. The results of the refermentation are shown in Table I.

Table I

| Age | Dry Weight Of Yeast, gram/l ter | Percent Ergosterol | Yield, Mg./liter |
|---|---|---|---|
| 0 | 12.92 | 2.12 | 270 |
| 4 | 19.64 | 2.36 | 470 |
| 8 | 19.90 | 4.86 | 955 |
| 12 | 21.68 | 4.60 | 998 |
| 16 | 23.64 | 2.96 | 708 |
| 28 | 27.56 | 2.04 | 552 |
| 40 | 27.92 | 6.44 | 1,785 |
| 52 | 25.94 | 5.52 | 1,425 |
| 64 | 22.08 | 8.12 | 1,790 |
| 76 | 21.64 | 10.60 | 2,290 |
| 88 | 14.78 | 10.28 | 1,524 |

EXAMPLE 2

A slant culture of MY306 was used to inoculate a 250 cc. shaker flask containing a medium consisting of yeast extract, an NZ-amine, and glucose. After growth had developed this was used to inoculate a two-liter shaker flask containing the same medium. The two-liter shaker flask culture (containing one liter) was used to inoculate a 50-gallon seed-tank fermenter containing 160 liters of a medium containing ten percent (wet weight) of domestic beet molasses, two percent (wet weight) corn steep liquor, and water to make 100%. The pH of the medium was seven before sterilizing for twenty minutes at 120° C. The fermentation was continued for forty-eight hours plus four hours down time at 30° C. at an agitation rate of 0.005 horse-power per gallon. The air-flow was maintained at 0.24 cubic foot per minute per gallon. The cells were then harvested (40 liters) by centrifugation and then placed into fresh medium (360 liters) having the same composition and refermented under the same condition as above, except that air was supplied at the rate of 0.16 cubic feet per minute per gallon, and a small quantity of Vegifat A, an antifoaming agent, was added. The results of the fermentation are shown in Table II.

Table II

| Age, Hours | Dry Weight Of Yeast, Gram/Liter | Percent Ergosterol | Yield, Milligram/Liter |
|---|---|---|---|
| 0 | 4.2 | 2.03 | 85 |
| 12 | 8.6 | 1.69 | 144 |
| 24 | 13.1 | 2.92 | 380 |
| 36 | 16.2 | 3.40 | 550 |
| 48 | 13.3 | 3.52 | 469 |
| 60 | 15.2 | 2.84 | 435 |
| 72 | 15.1 | 3.08 | 467 |
| 84 | 13.4 | 3.44 | 460 |
| 96 | 13.7 | 5.20 | 710 |
| 108 | 11.2 | 6.50 | 730 |

EXAMPLE 3

A slant culture of MY306 was used to inoculate a 250 cc. shaker flask containing a medium consisting of yeast extract, NZ-amine, and glucose. After growth had developed this was used to inoculate a two-liter shaker flask containing the same medium. The two-liter shaker flask culture was used to inoculate a 50-gallon seed tank fermenter containing 160 liters of a medium containing five percent glucose, one percent yeast autolysate, one percent NZ-amine (a protein hydrolysate digest obtained from fresh fat-free milk produced by Sheffield Co.), 0.1% $KH_2PO_4$, and water to make 100%. The temperature was maintained at 30° C. and the air-flow at 0.24 cubic foot per minute per gallon, while the agitation was at 0.005 horse-power per gallon. The fermentation period was for thirty-six hours.

The cells were then harvested (80 liters) by centrifugation and added to a new medium (320 liters) composed of fifteen percent domestic beet molasses, two percent corn steep liquor, and the remainder water having a pH of seven before sterilizing. The fermentation was carried on for 78 hours at a temperature of 30° C., air-flow of 0.16 cubic foot per minute per gallon, and an agitation of 0.005 horse-power per gallon with a small amount of Vegifat A as an antifoaming agent. The cells were harvested by centrifugation, and concentrated to eighty liters. The cells were then refermented in 340 liters of a medium comprising fifteen percent domestic beet molasses, two percent corn steep liquor, fifty parts per million $CaSO_4.5H_2O$, and water to make 100%. The medium had a pH of seven prior to sterilization. The fermentation was carried out under the same conditions, as previously, for seventy-two hours. The results of the fermentation are shown in Table III.

Table III

| Age, Hours | Dry Weight Of Yeast, Gram/Liter | Percent Ergosterol | Yield, Milligram/Liter |
|---|---|---|---|
| 0 | 12.8 | 4.2 | 580 |
| 12 | 21.2 | 2.86 | 605 |
| 24 | 32.5 | 2.60 | 845 |
| 36 | 34.4 | 3.64 | 1,270 |
| 48 | 36.6 | 3.2 | 1,190 |
| 60 | 26.5 | 7.6 | 2,375 |
| 72 | 21.8 | 11.0 | 2,398 |

EXAMPLE 4

The fermentation was carried out as follows:

Culture: MY306

Slant medium: Potato infusion—yeast extract—dextrose—agar

Inoculum medium:
    Yeast extract _____ percent __ 1.0
    Dextrose _____ do ____ 2.0

Fermentation medium:
    "Growth":
        Domestic beet molasses _____ percent __ 10.0
        Corn steep liquor _____ do ____ 2.0
        pH (prior to sterilization) _____ 7
    "Refermentation":
        Domestic beet molasses _____ percent __ 7.0
        Corn steep liquor _____ do ____ 1.4
        pH (prior to sterilization) _____ 7

Procedure and results:

One loop full from a stock culture of MY306-0 is transferred to a 250 milliliter shake flask containing 50 milliliters of inoculum medium. After 24 hours of incubation at 28° C., 50 milliliters of the yeast containing 500 milliliters of yeast suspension is transferred to a two-liter baffled shake flask containing 500 milliliters of inoculum medium. This flask in turn is incubated at 28° C. for 24 hours.

A thirty-liter fermenter containing nineteen liters of the "growth" medium is inoculated with 1.5 liters of yeast suspension from the two-liter baffled flasks. The fermentation is allowed to proceed for 48 hours under the following conditions:

Temperature: 28° C.
Agitation: One four-bladed Mixco impeller six inches in diameter turning at 325 revolutions per minute.
Air-flow: Eighteen feet per hour.
Antifoam (use as necessary): "Vegifat A."

Pertinent data for this fermentation are shown in Table IV.

Table IV

| Time, Hours | Dry Weight, Gram/Liter | Percent Ergosterol | Yield, Milligram/Liter |
|---|---|---|---|
| 24 | 13.7 | 2.3 | 317 |
| 48 | 20.3 | 4.4 | 900 |

At the end of forty-eight hours the yeast is separated in a Sharples centrifuge. The yeast cake obtained contains thirty to thirty-five percent dry yeast. One hundred and fifty grams of this wet cake are charged to the five-liter fermenter containing 3.2 liters of the "refermentation" medium.

The conditions for this fermentation are:

Temperature: 28° C.
Agitation: 0.0035 horse power per gallon.
Air-flow: Thirty-six feet per hour.
Antifoam (use as necessary): "Vegifat A."

Table V shows the data for this fermentation. Each value is an average figure for three fermenters.

Table V

| Time, Hours | Dry Weight, Gram/Liter | Percent Ergosterol | Yield, Milligram/Liter |
|---|---|---|---|
| 0 | 16.19 | 5.03 | 815 |
| 12 | 25.78 | 5.59 | 1,440 |
| 24 | 28.71 | 6.60 | 1,890 |
| 36 | 29.23 | 6.61 | 1,930 |
| 48 | 30.04 | 6.09 | 1,830 |
| 60 | 30.04 | 5.52 | 1,660 |
| 72 | 27.61 | 6.37 | 1,760 |
| 84 | 31.27 | 8.83 | 2,760 |
| 96 | 28.90 | 11.32 | 3,270 |
| 108 | 28.42 | 12.64 | 3,600 |

EXAMPLE 5

The effect of nitrogen on ergosterol production was determined by varying the amount of ammonium sulfate present in the basic medium. The procedure and basic medium are the same as Example 2. The results are shown in Table VI.

Table VI

| Ammonium Sulfate | Dry Weight, Gram/Liter | Percent Ergosterol | Yield, Gram/Liter |
|---|---|---|---|
| 0.0 | 18.9 | 11.3 | 2.14 |
| 0.1 | 19.8 | 10.7 | 2.14 |
| 2.0 | 18.1 | 11.1 | 2.00 |

EXAMPLE 6

It was found that the addition of organic supplements, such as corn steep liquor, give an increase in cell growth without affecting the percentage of ergosterol. This is shown in Example 1, and with the same basic medium varied as indicated.

Table VII

| Percent Corn Steep Liquor | Dry Weight of Yeast, Gram/Liter | Percent Ergosterol |
|---|---|---|
| Growth Phase: | | |
| 0.0 | 9.5 | 6.3 |
| 1.0 | 11.0 | 7.4 |
| 2.0 | 12.3 | 7.1 |
| 4.0 | 14.0 | 7.3 |
| Replacement Phase: | | |
| 0.0 | 18.3 | 10.0 |
| 1.0 | 22.4 | 10.9 |
| 2.0 | 21.4 | 8.8 |
| 4.0 | 23.3 | 10.0 |

EXAMPLE 7

Fermentations with the noted microorganism were carried out as follows:

Inoculum: Cells developed for three days in five percent glucose, one percent yeast extract, one percent NZ-amine, 0.1 percent potassium dihydrogen phosphate, and distilled water to make 100%.

Fermentation medium:
  Inverted blackstrap molasses _____ percent __ 20
  Corn steep liquor _____ do ____ 2
  Yeast extract _____ do ____ .1
  Malt extract _____ do ____ .1
  Distilled water to make one liter.
  pH adjusted to 9.2 before autoclaving, fall to 7.0 following sterilization.

Depth of medium: 50 milliliters per 250 milliliters Erlenmeyer flasks.
Aeration: 220 revolutions per minute.
Temperature: 28° C.
Method: After three days' growth on shakers in the inoculum medium, the flasks were placed on a laboratory bench until the cells settled out; the spent inoculum medium was decanted and fresh fermentation medium added (50 milliliters per flask). Flasks were replaced on shaker and replicates removed after 1, 2, 3, and 4 days' further incubation. These replicates and extra inoculum flasks were analyzed. The results are indicated in Table VIII.

Table VIII

| Strain Number | Inoculum Dry Wt., mg./100 ml | 1 Day Dry Wt., mg./100 ml | 1 Day Percent Sterol | 2 Days Dry Wt., mg./100 ml | 2 Days Percent Sterol | 3 Days Dry Wt., mg./100 ml | 3 Days Percent Sterol | 4 Days Dry Wt., mg./100 ml | 4 Days Percent Sterol |
|---|---|---|---|---|---|---|---|---|---|
| MY306 | 1,451 | 3,144 | 4.5 | 3,060 | 6.3 | 3,064 | 10 | 3,251 | 9 |
| MY784 | 1,332 | 3,073 | 4.3 | 3,123 | 6.4 | 3,225 | 8 | 3,319 | 8 |
| MY797 | 1,331 | 3,027 | 4.4 | 3,112 | 5.8 | 3,232 | 8.3 | 3,372 | 7.63 |
| MY798 | 1,099 | 2,733 | 7.2 | 2,840 | 9.0 | 2,778 | 10.7 | 2,996 | 10.6 |
| MY813 | 1,224 | 2,894 | 7.8 | 3,148 | 6.0 | 3,405 | 6.8 | 3,605 | 10.4 |
| MY814 | 1,043 | 2,695 | 4.2 | 2,872 | 4.3 | 2,973 | 6.5 | 3,950 | 5.3 |
| MY815 | 1,488 | 3,059 | 7.5 | 3,191 | 6.2 | 3,411 | 6.5 | 3,650 | 7.0 |
| MY816 | 1,300 | 2,800 | 5.6 | 2,780 | 3.8 | 2,987 | 5.3 | 3,118 | 8.9 |

EXAMPLE A

Ergosterol assay procedure

The broth from the fermentors is either handled immediately or stored under refrigeration until convenient for work up. One hundred milliliter samples of uniform broth are centrifuged. All centrifugations are of approximately five-minutes duration at 3000 revolutions per minute. The solids are given one 50 milliliter washing with distilled water. Particular care is taken to resuspend solids uniformly during washing.

The solids are carefully removed and transferred from tubes with a spatula and placed on a Büchner funnel. The residual solids are washed from the tube with ten to fifteen milliliters of water, and this is added to the funnel. Ten to twenty minutes are ordinarily required to complete filtration of the pad.

The filtered pads are air-dried at 70°–80° C. for ten hours. Dry-weight determinations are made on the pads with the weighed filter paper. The dried yeast is removed from the paper and milled in a Wiley mill, using a sixty mesh screen in the mill. Approximately one to three minutes are required to get most of the material to pass the sixty mesh screen. The milled material is passed through an eighty mesh screen, and five-hundred milligrams are extracted with ether in the Soxhlet extractor for six hours.

The ether extract is taken down to dryness at normal room temperature. The residue is taken up in twenty milliliters of chloroform, and one milliliter of the solution is further diluted one-tenth. Sufficient sample to obtain 0.1 to 0.4 milligram ergosterol for assay is added to colorimeter tubes using chloroform to make a final volume of five milliliters. Five milliliters of the reagent is added with shaking to each tube to develop color, and the transmissions are read on a Lumetron at exactly a ten-minute interval, using a 660 mu narrow band filter. At exactly a twenty-minute interval, the transmission is taken using a 420 mu narrow band filter. Ergosterol values are calculated from a standard curve prepared from pure ergosterol, and the lowest figure is reported.

The reagent for the color reaction consists of 2.5 milliliters of ninety-five percent sulfuric acid and 37.5 milliliters of acetic anhydride made up to 100 milliliters in chloroform. The sulfuric acid is added to the cooled solution of acetic anhydride and the bulk of the chloroform with cooling in a water bath. Avoid adding sulfuric acid to the acetic anhydride alone and thoroughly mix the chloroform-acetic anhydride solution. Reagent should be used within one hour after preparation.

Samples are also routinely run for U. V. absorption between 2500 and 3000 A. using a Cary spectrophotometer. The dilutions used for the colorimetric determinations can usually be used directly. If a concentration of more than twelve milligrams per one-hundred milliliters is used, a further one-tenth dilution is necessary. The calculation is made at 2960 and 2850 A.; in addition, the difference method is used at these two wave lengths. The lowest figure is reported.

Any departure from the above description which conforms to the present invention is intended to be included within the scope of the claims.

What is claimed is:

1. In the process wherein a microorganism is propagated in a nutrient medium to produce yeast, the improvement which comprises increasing the ergosterol content of the yeast by propagating a species of *Saccharomyces cerevisiae* selected from the group consisting of NRRL–Y2243, NRRL–Y2244, NRRL–Y2245, NRRL–Y2250, NRRL–Y2246, NRRL–Y2247, NRRL–Y2248 and NRRL–Y2249.

2. In the process wherein a microorganism is propagated under aerobic conditions in an aqueous nutrient medium to produce yeast, the improvement which comprises increasing the ergosterol content of the yeast by propagating a species of *Saccharomyces cerevisiae* selected from the group consisting of NRRL–Y2243, NRRL–Y2244, NRRL–Y2245, NRRL–Y2250, NRRL–Y2246, NRRL–Y2247, NRRL–Y2248 and NRRL–Y2249.

3. In the process wherein a microorganism is propagated under aerobic conditions in an aqueous nutrient medium to produce yeast, the improvement which comprises increasing the ergosterol content by propagating the microorganism *Saccharomyces cerevisiae* NRRL–Y2243.

4. In the process wherein a microorganism is propagated under aerobic conditions in an aqueous nutrient medium to produce yeast, the improvement which comprises increasing the ergosterol content by propagating the microorganism *Saccharomyces cerevisiae* NRRL–Y2244.

5. In the process wherein a microorganism is propagated under aerobic conditions in an aqueous nutrient medium to produce yeast, the improvement which comprises increasing the ergosterol content by propagating the microorganism *Saccharomyces cerevisiae* NRRL–Y2250.

6. In the process wherein a microorganism is propagated under aerobic conditions in an aqueous nutrient medium to produce yeast, the improvement which comprises increasing the ergosterol content by propagating the microorganism *Saccharomyces cerevisiae* NRRL–Y2246.

7. In the process wherein a microorganism is propagated under aerobic conditions in an aqueous nutrient medium to produce yeast, the improvement which comprises increasing the ergosterol content by propagating the microorganism *Saccharomyces cerevisiae* NRRL–Y2249.

8. A process for preparing yeast having a high ergosterol content which comprises growing a strain of *Saccharomyces cerevisiae* selected from the group consisting of NRRL–Y2243, NRRL–Y2244, NRRL–Y2245, NRRL–Y2250, NRRL–Y2246, NRRL–Y2247, NRRL–Y2248 and NRRL–Y2249, under aerobic conditions in a nutrient medium, separating the microorganism from the medium upon approximately maximum growth and then refermenting the separated microorganism in a fresh medium.

9. A process for preparing yeast having a high ergosterol content which comprises propagating a strain of *Saccharomyces cerevisiae* selected from the group consisting of NRRL–Y2243, NRRL–Y2244, NRRL–Y2245, NRRL–Y2250, NRRL–Y2246, NRRL–Y2247, NRRL–Y2248 and NRRL–Y2249, under aerobic conditions in an aqueous medium, separating the propagation microorganism from the medium and then propagating the separated microorganism under aerobic conditions in a fresh aqueous medium.

10. The process of claim 9 wherein the propagations are carried out at a temperature of approximately 30° C.

11. A process for preparing yeast having a high ergosterol content which comprises propagating a strain of *Saccharomyces cerevisiae* selected from the group consisting of NRRL–Y2243, NRRL–Y2244, NRRL–Y2245, NRRL–Y2250, NRRL–Y2246, NRRL–Y2247, NRRL–Y2248 and NRRL–Y2249 under aerobic conditions in an aqueous medium comprising assimilable source of carbon and nitrogen, separating the propagated microorganism from the medium and then propagating the separated microorganism under aerobic conditions in a fresh aqueous medium.

12. A process for the manufacture of yeast having a high ergosterol content which comprises growing a strain of *Saccharomyces cerevisiae* selected from the group consisting of NRRL–Y2243, NRRL–Y2244, NRRL–Y2245, NRRL–Y2250, NRRL–Y2246, NRRL–Y2247, NRRL–Y2248 and NRRL–Y2249 in the presence of a non-toxic oxidizing agent in an aerated nutritive medium deficient in assimilable nitrogen and then further propagating the microorganism so produced by subjecting it to a further aeration in a fresh nutrient medium deficient in assimilable nitrogen, and in the presence of a nontoxic oxidizing agent at a temperature higher than that in the initial cultivation.

13. A process for the manufacture of yeast having a high ergosterol content which comprises growing a strain of Saccharomyces cerevisiae selected from the group consisting of NRRL-Y2243, NRRL-Y2244, NRRL-Y2245, NRRL-Y2250, NRRL-Y2246, NRRL-Y2247, NRRL-Y2248 and NRRL-Y2249 in the presence of a nontoxic oxidizing agent in an aerated nutritive medium deficient in assimilable nitrogen.

14. A process for preparing yeast having a high ergosterol content by propagating a strain of Saccharomyces cerevisiae selected from the group consisting of NRRL-Y2243, NRRL-Y2244, NRRL-Y2245, NRRL-Y2250, NRRL-Y2246, NRRL-Y2247, NRRL-Y2248 and NRRL-Y2249 under aerobic conditions in a nutrient medium, and repeatedly transferring the microorganism from medium to medium at a period of time when the sugar first shows appreciable depletion.

15. A process for preparing yeast having a high ergosterol content by propagating a strain of Saccharomyces cerevisiae selected from the group consisting of NRRL-Y2243, NRRL-Y2244, NNRL-Y2245, NRRL-Y2250, NRRL-Y2246, NRRL-Y2247, NRRL-Y2248 and NRRL-Y2249 under aerobic conditions in a nutrient medium while maintaining the carbohydrate content of the medium at approximate uniform concentration.

16. A process for preparing yeast having a high ergosterol content by propagating a strain of Saccharomyces cerevisiae NRRL-Y2243 under aerobic conditions in an aqueous medium containing ten percent beet molasses and two percent corn steep liquor for about 40 to 88 hours, separating the microorganism from the medium and then repropagating the separated microorganism in a fresh aqueous medium containing ten percent beet molasses and two percent corn steep liquor.

17. A process for preparing yeast having a high ergosterol content by propagating a Saccharomyces cerevisiae NRRL-Y2243 under aerobic conditions in an aqueous medium containing ten percent beet molasses and two percent corn steep liquor for 24 to 108 hours.

References Cited in the file of this patent

UNITED STATES PATENTS

| 2,059,980 | Bennett | Nov. 3, 1936 |
| 2,276,710 | Bennett | Mar. 17, 1942 |

OTHER REFERENCES

"Antibiotics," 1949, by Pratt and Dufrenoy, published by J. B. Lippincott Co. (Philadelphia), pages 32 and 33.